US007684406B2

(12) United States Patent
Hahn

(10) Patent No.: US 7,684,406 B2
(45) Date of Patent: Mar. 23, 2010

(54) DATA PACKET FILTERING IN A CLIENT-ROUTER SERVER ARCHITECTURE

(75) Inventor: Andreas Hahn, Muhlhausen (DE)

(73) Assignee: SAP AG, Walldorf (DE)

( * ) Notice: Subject to any disclaimer, the term of this patent is extended or adjusted under 35 U.S.C. 154(b) by 490 days.

(21) Appl. No.: 10/571,299

(22) PCT Filed: Sep. 2, 2004

(86) PCT No.: PCT/EP2004/009745

§ 371 (c)(1),
(2), (4) Date: Mar. 10, 2006

(87) PCT Pub. No.: WO2005/027470

PCT Pub. Date: Mar. 24, 2005

(65) Prior Publication Data

US 2007/0027995 A1    Feb. 1, 2007

(30) Foreign Application Priority Data

Sep. 18, 2003    (EP)    .................................... 03021092

(51) Int. Cl.
*H04L 12/28* (2006.01)
(52) U.S. Cl. ................. 370/395.2; 370/395.3; 370/401; 370/411; 709/222; 709/229
(58) Field of Classification Search ................. 370/389, 370/392, 401–403, 397, 901, 341, 399; 726/11, 726/12, 13
See application file for complete search history.

(56) References Cited

U.S. PATENT DOCUMENTS

| 5,430,727 | A | * | 7/1995 | Callon | ......................... 370/401 |
| 5,943,317 | A | * | 8/1999 | Brabson et al. | ............. 370/238 |
| 6,147,976 | A | | 11/2000 | Shand et al. | |
| 7,046,666 | B1 | * | 5/2006 | Bollay et al. | ................. 370/392 |
| 2002/0003780 | A1 | * | 1/2002 | Braun et al. | ................. 370/254 |
| 2002/0013844 | A1 | | 1/2002 | Garrett et al. | |
| 2002/0075866 | A1 | * | 6/2002 | Troxel et al. | ................. 370/389 |
| 2003/0110273 | A1 | * | 6/2003 | Ventura | ...................... 709/229 |

(Continued)

OTHER PUBLICATIONS

"Search Report for International Application No. PCT EP 2004009745", Mar. 21, 2006, 8 pgs.

(Continued)

*Primary Examiner*—Huy D Vu
*Assistant Examiner*—Zewdu Beyen
(74) *Attorney, Agent, or Firm*—Schwegman, Lundberg & Woessner, P.A.

(57) ABSTRACT

A computer network system comprising a plurality of client hardware elements forming a computer network (414); a server network segment (412); and a router (416) for interconnecting the computer network (414) with the server network segment (412); the computer network (414) being assigned at least one first access address range, and the server network segment (412) being assigned at least one second access address range and at least one third access address range, wherein the at least one second access address range is separate from the at least one first access address range and the at least one third access address range represents at least a sub-range of the at least one first access address range, and wherein the router (416) is set up to only route addresses within the same access address range.

12 Claims, 5 Drawing Sheets

U.S. PATENT DOCUMENTS

| | | | |
|---|---|---|---|
| 2003/0198219 A1* | 10/2003 | Coggeshall | 370/389 |
| 2004/0122974 A1* | 6/2004 | Murakami | 709/245 |
| 2005/0041596 A1* | 2/2005 | Yokomitsu et al. | 370/252 |
| 2006/0087962 A1* | 4/2006 | Golia et al. | 370/216 |
| 2006/0114835 A1* | 6/2006 | Horoschak et al. | 370/252 |
| 2006/0218512 A1* | 9/2006 | Arslan et al. | 716/4 |
| 2006/0253901 A1* | 11/2006 | Roddy et al. | 726/11 |
| 2007/0022477 A1* | 1/2007 | Larson | 726/15 |
| 2007/0150945 A1* | 6/2007 | Whitaker et al. | 726/13 |

OTHER PUBLICATIONS

"PCT Search Report for WO2005 027470A1", (Nov. 3, 2004), 2 pgs.

* cited by examiner

DATA PACKET FILTERING IN A CLIENT-ROUTER SERVER ARCHITECTURE

This application is a U.S. National Stage Filing under 35 U.S.C. 371 from International Patent Application No. PCT/EP2004/009745, filed on Sep. 2, 2004, and published as WO 2005/027470 A1on Mar. 24, 2005, which claims priority under 35 U.S.C. § 119(a)-(d) or 365(b) from European Patent Application No. 03 021 092.6, filed Sep. 18, 2003, the entire content of each of the applications is incorporated herein by reference.

FIELD OF THE INVENTION

The present invention relates generally to the field of electronic data processing and digital communications networks, and more particularly to a network system, a router and a network setup method.

DESCRIPTION OF THE RELATED ART

Digital communications networks have continued to grow in importance as people have come to rely on the electronic exchange of information to support both business and personal pursuits. Email, the electronic transfer of files, and various other services are all made possible by the use of digital communications networks. The type of digital communications network employed often depends on the size of the network to be implemented as well as the needs and capabilities of the party or parties implementing the network. Hardware cost and network management complexity are often a factor when choosing the type of network to be implemented.

Networks limited to a small geographical region, e.g. a single office location, are frequently called local area networks (LANs). LANs are often privately-owned networks within a building or building agglomeration and are widely used to connect personal computers and workstations at a single location to one another and to shared resources such as printers and/or local centralized files storage. In order to be able to communicate between the various workstations, printers, databases etc. linked together within a LAN, any device is assigned a unique address, i.e. a 48-bit Media Access Control (MAC) address.

Computers and other devices located on different LANs are often connected with each other via an internet. The World Wide Web or "the" Internet is used to connect computers and other devices located at universities, government offices, businesses and individuals together. Routers serve as forwarding devices and, optionally, as gateway devices. IP addresses serve to identify source and destination devices and to determine the appropriate route upon which packets should be transmitted. Source and destination IP addresses are included, along with data, in IP packets used to transmit information across the Internet. Every host and router on the Internet has an IP address which encodes its IP network number and host number. The combination is unique; no two machines have the same IP address. All IP addresses are 32 bits long and are used in the source address and destination address fields of IP packets.

U.S. Pat. No. 6,147,976 provides a packet filtering system permitting filtering based on both source and destination addresses. The disclosed packet filtering system associates domain identifiers with respective sets of addresses. This relationship is maintained in a predefined address table or tables. The address table entries each have a domain prefix and a domain identifier associated with this prefix. A domain prefix is determined that matches the source address, as well as a domain prefix matching the destination address. These prefixes are associated with a source domain identifier and destination domain identifier, respectively. In this way, a source domain identifier and a destination domain identifier are obtained reflecting the information found in the packet header.

Thus, existing conventional IT system environments are server oriented with each server having one unique IP address. A server is a computer which provides service(s) for other computers (clients) connected to the server via a network. All services being run on such a server can communicate with the outside world via this address. Each service on the server is assigned a unique port number and can be addressed unambiguously with a combination of IP address and port number. For example, if the IP address of a server is 10.10.10.100 and the port number of a given service on this server is 80, the combination would be 10.10.10.100:80.

U.S. Pat No. 2002/013844 A1 refers to a system with an access network wherein the system enables multiple services or service providers to share the facilities of the access network infrastructure providing physical network forwards packets to any of a plurality of service networks. Router uses a policy based on the source address of the packets determined which service network to forward the packet. Each service is assigned a specific network address.

In a modern system environment, the servers are booted via PXE/BOOTP/TFTP (Portable Execution Environment/Bootstrap Protocol/Trivial File Transfer Protocol) in the LAN and are assigned a unique IP address via DHCP (Dynamic Host Configuration Protocol), their "physical IP". Each service started on a server also is assigned its own "virtual IP" address. This allows that services are run independently from the machines, i.e. the services can actually be run on any server without the need for the client to change the configuration. E.g. a client accesses a service always at 10.10.10.10, which can be run on the server 10.10.1.2 or any other server in this LAN. The physical IP of the server running the service is not known and does not need to be known by the client. To the outside world, such a system environment appears as a closed unity which offers its services to outside users with only little configuration effort.

As already outlined above server in traditional system environments are typically located in a own network segment which is called the server LAN. The server LAN is connected to the corporate LAN via a router. Access to the server LAN is regulated by means of access lists which for example block port ranges or IP ranges. FIG. 1 shows a traditional system environment with same IP address ranges (in the following also designated as "IP ranges"), comprising a server LAN 112 which is connected to a corporate LAN or WAN 114 via a router 116. Access lists which are administrated in the router 116 form the basis for allowing or blocking connections. In the example illustrated in FIG. 1, a client with the IP address 10.20.30.40 could for example access a service with IP port range 10.10.10.100:80, but not a service with IP port range 10.10.10.100:23.

In more modern system environments, the servers are also located in an own network segment (server LAN) which is connected to the corporate LAN via an application level gateway. A gateway is a device which interconnects networks with different incompatible communications protocols comprising a protocol conversion to translate one set of protocols into another set. In such an environment, the server LAN has to be run in an autarkic manner. To achieve this, the server LAN has its own IP range and the routing between the corporate LAN and the server LAN is not activated as any moving of the system environment would either require a total change of all the routing tables in the corporate LAN or a complete change to the IP configuration of the server LAN. Therefore, the gateway computer is assigned to one or more IP addresses within the IP range of the corporate LAN through which the services are available.

FIG. 2 illustrates an example of a network setup with separate IP ranges as known from the prior art. In this known setup, a server LAN 212 is again connected to a corporate LAN or WAN 214, this time via a gateway system comprising a so-called proxy server 216. A proxy server (or proxy) is an entity which is commonly established on a LAN where it is located between a client and the "real" server. All requests of the client are then made through the proxy which in turn makes requests from the "real" server and passes the result back to the client. Sometimes the proxy stores the result and give a stored result instead of making a new one (in order to reduce use of a network).

Referring again to FIG. 2, in case of a client query the proxy 216 is indicated as a sender side intermediate station for reaching the desired service. The protocols used by the services run on the server LAN therefore have to be suitable for a proxy use. The gateway system further comprises a forwarding rule table 218 which allows the so-called forwarding. This means that a given combination of IP address and port number (e.g. 10.10.10.100:80) of the corporate LAN is being assigned to a given combination of IP address and port number (e.g. 192.168.10.100:80) of the server LAN. As a result, that path of the connection is fixedly configured in the gateway and not in the client. A disadvantage of this network setup is that it has to be known for every protocol used by a service which type of connection the given protocol uses. Protocols which are able to build up a second connection path (for example a backward channel like FTP (File Transfer Protocol) does) on their own may not be linked in via the so-called forwarding. The only possible transport protocol for forwarding is the stream type protocol TCP (Transmission Control Protocol). Bi-directional communication via package type communication protocols such as UDP (User Datagram Protocol) or IGMP (Internet Group Management Protocol) are not possible.

FIG. 3 finally shows a further network setup as known from the prior art in which a server LAN 312 is connected to a corporate LAN or WAN 314 via a so-called Network Address Translation (NAT) service 316. NAT is an improvement of the forwarding service as described above and has the advantage of allowing the use of package type protocols like UDP and IGMP. In NAT, the gateway internally holds a module with link tables for every communication protocol type. This allows setting up a back connection from the server LAN into the corporate LAN in case the communication protocol is known and implemented into the module. However, there is the disadvantage that not all protocol implementations are known and implemented in such modules, so they cannot be used with NAT.

As IP addresses are limited resources, the problem is to provide a network setup which allows a flexible assignment of addresses to access services run on a server without having to implement extensive access lists or forwarding rules.

SUMMARY OF THE INVENTION

It is therefore an object of the invention to provide a network system, a router and a network setup method within improved accessing mechanisms for services. This object is achieved by proposing a network system with the features of claim 1, a router with the features of claim 6 and a network setup method with the features of claim 9.

According to the invention, a computer network system comprises a plurality of client hardware elements forming a computer network such as a Local Area Network LAN or Wide Area Network WAN or any other type of computer network, and a server network segment. The server network segment is interconnected with the computer network by means of a router. A router is a well-known device to the person skilled in the art which serves to forward packets between networks. The forwarding decision of the router is based on network layer information and/or routing tables (often constructed by routing protocols). In the invention, the computer network is assigned a first access address range, and said server network segment is assigned a second access address range and a third access address range. Further, the second access address range is separate from the first access address range and the third access address range represents at least a sub-range of the first access address range, the router being set up to only route addresses within the same access address range.

The invention allows the use of a standard router with the possibility of defining address ranges to be passed and address ranges to be blocked. This can be done for example with a conventional filter by defining the according ranges of the second and third access address ranges, respectively. As a result, no complex access lists have to be managed any more, and a moving of a service can be handled automatically by adjusting the new address range. The invention consists in a mixture of shared address ranges and separate address ranges which also allows creation of back connections as well as the use of UDP and IGMP.

In one possible embodiment, the network addresses to access services in the invention are Internet Protocol (IP) addresses, but any other address or protocol system can be used in connection with the invention.

The invention also covers a computer program with program coding means which are suitable for carrying out a process according to the invention as described above when the computer program is run on a computer. The computer program itself as well as stored on a computer-readable medium is claimed.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

The invention is schematically illustrated in the drawings by means of an embodiment by way of example and is hereinafter explained in detail with reference to the drawings. It is understood that the description is in no way limiting on the scope of the present invention and is merely an illustration of a preferred embodiment of the invention.

DETAILED DESCRIPTION

Figure 1:
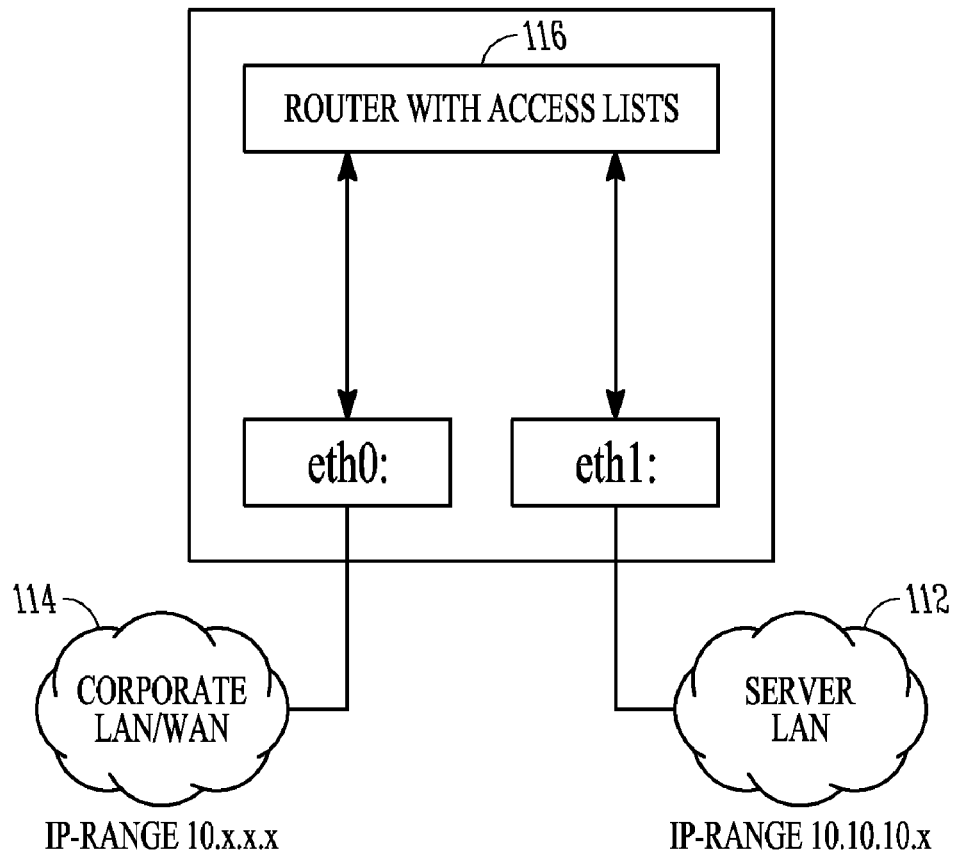
FIG. 1 is a prior right network setup with shared IP ranges.
Figure 2:
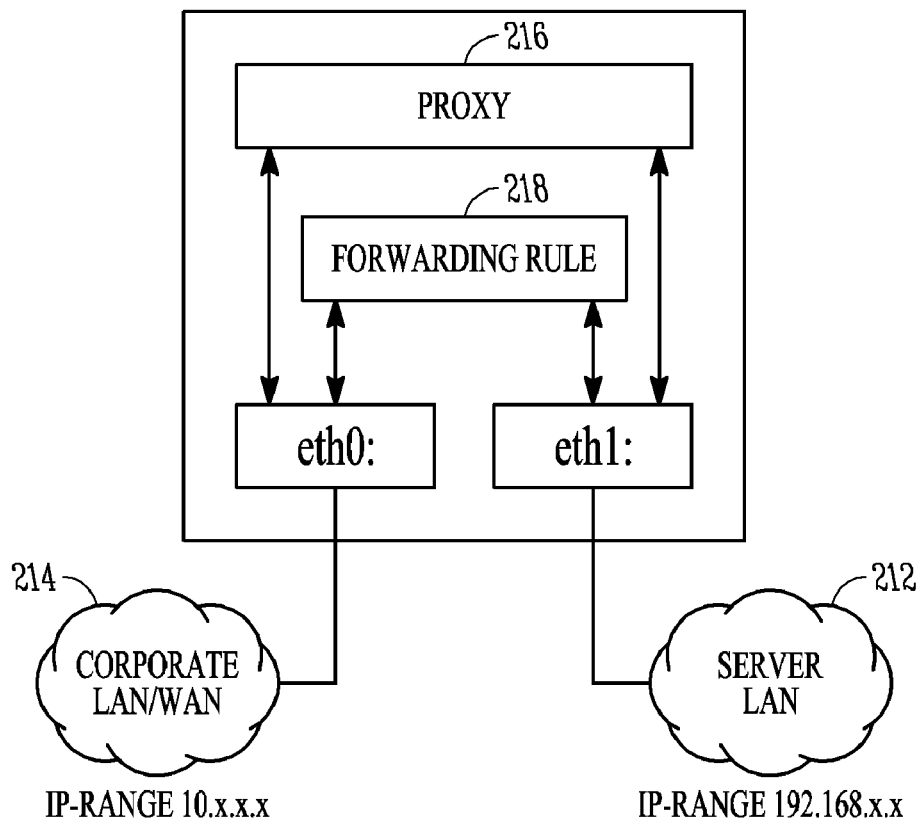
FIG. 2 is a prior art network setup with separate IP ranges using a proxy.
Figure 3:
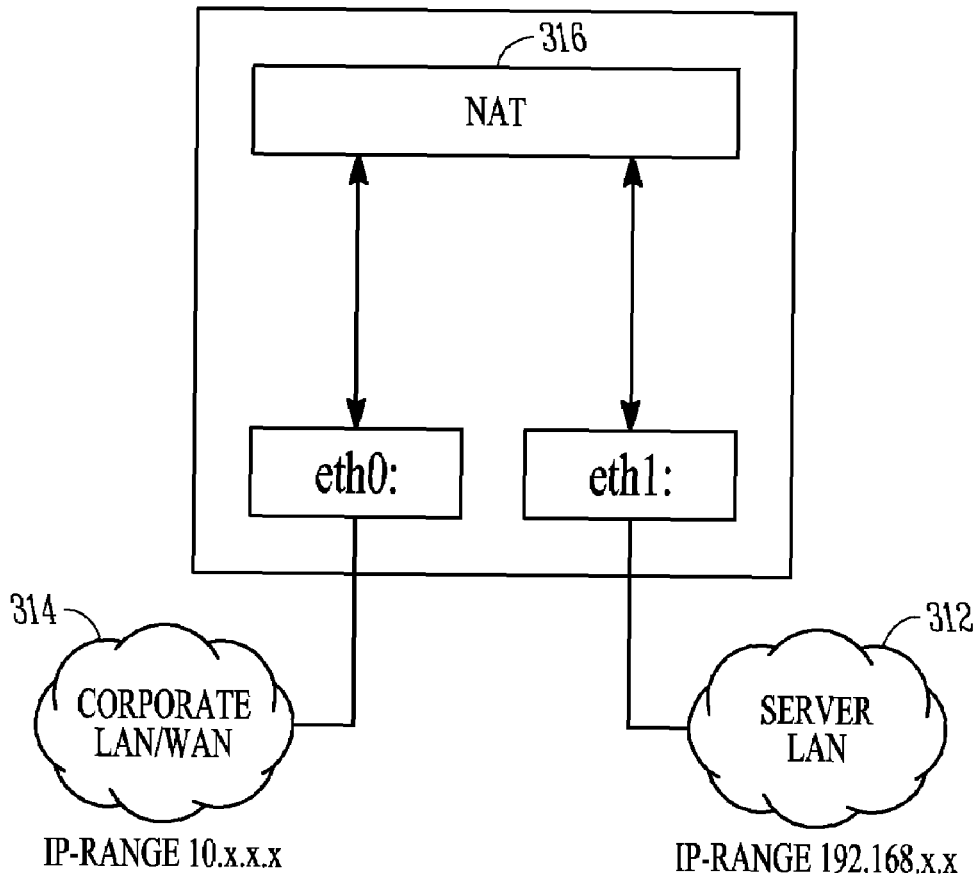
FIG. 3 is a prior art network setup with separate IP ranges using network address translation.
Figure 4:
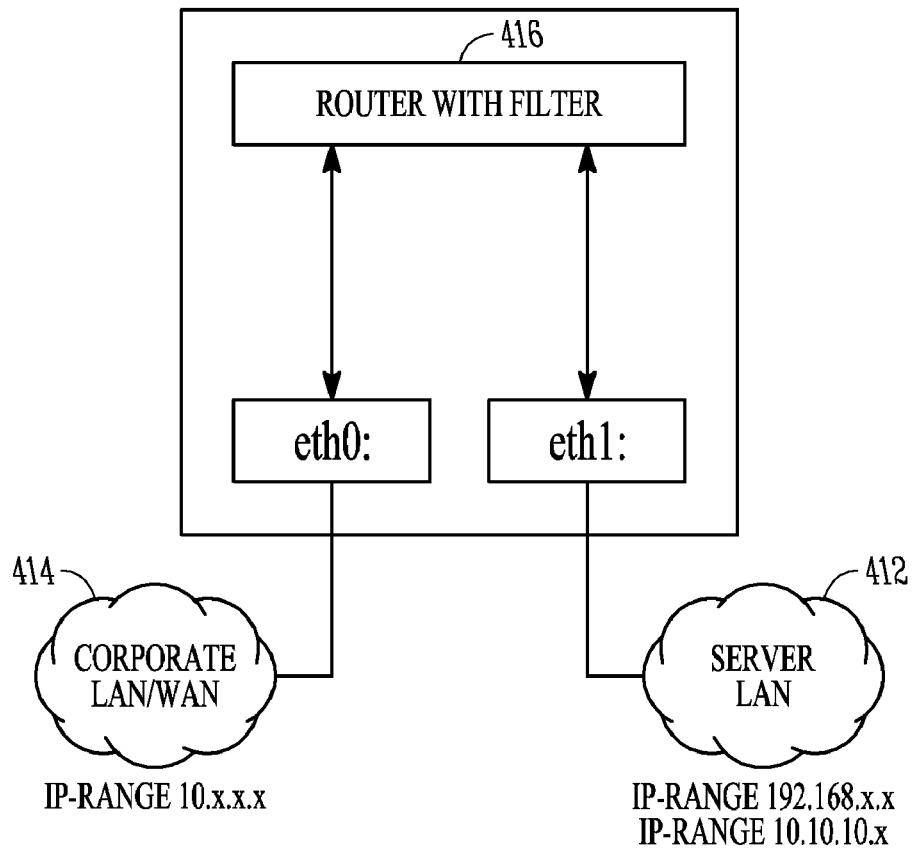
FIG. 4 is a block diagram of a network setup with separate IP ranges according to the invention.

The invention is illustrated by means of one possible embodiment in which the computer network is a so-called Corporate LAN or WAN which is depicted as a cloud in the schematic block diagram illustration of FIG. 4, and in which the server network segment is a so-called Server LAN which is also depicted as a cloud. The access address ranges referred to in the embodiment are IP address ranges. However, it is clear to the person skilled in the art of network systems that any other type of network and/or server arrangement and/or protocol can be used in connection with the invention.

FIG. 4 shows a network setup according to the invention. The network comprises a server LAN 412 and a corporate LAN or WAN 414. The server LAN 412 and the corporate LAN 414 are connected with each other via a router 416. The connection between the corporate LAN 414 and the server LAN 412 with the router 416 are established via Ethernet cards ETH0: and ETH1: respectively. Of course, any other link type, such as FDDI, Token Ring, SLIP, PPP etc. may be used.

The corporate LAN 414 and the server LAN 412 have separate IP ranges which is illustrated by the indication "IP range 10.x.x.x" underneath the corporate LAN 414 and the depictions "IP range 192.168.x.x" and "IP range 10.10.10.x" underneath the server LAN 412.

According to the invention each service on the server LAN is assigned an IP address. Every service on the server LAN which shall be open for access to the corporate LAN is assigned an IP address within the corporate LAN IP range(s) (e.g. 10.10.10.100). Every service which shall only be available internally to the server LAN is assigned an IP address within the server LAN IP range (e.g. 192.168.10.100). This also applies to the IP addresses of the respective hardware. Each hardware element is assigned an IP address. Within the scope of the present invention a hardware element shall be understood as a kind of service.

As will be understood by a person skilled in the art, the corporate LAN 414 may be assigned one or several further IP ranges (e.g. 172.x.x.x), and the server LAN 412 could also be assigned further IP ranges, accordingly, which could be sub-ranges to the further IP ranges of the corporate LAN (e.g. 172.10.20.x and/or 172.20.x.x). It becomes apparent that within the scope of this invention, any number of access address ranges can be used and mixed on both sides, i.e. network and server, with the router defining ranges to be routed (routable ranges) and ranges not to be routed (non-routable ranges). The ranges can have any addresses as long as the logical relation between routable and non-routable ranges is properly defined in the router.

The connection between the corporate LAN 414 and the server LAN 412 is established by the router 416 which can be a standard router with a package filter. The filter is implemented in such a manner that the server LAN exclusive IP range 192.168.x.x is blocked and only the common or shared range 10.10.10.x is routed. The use of filters which are set up in view of the common IP range improves the system security. Filter rules regarding the IP range of the server LAN 412 only have to be implemented once for the whole system lifetime. It is to be understood that the router setup can also be done without filter definitions, for example by means of routing tables or routing protocols.

Figure 5:
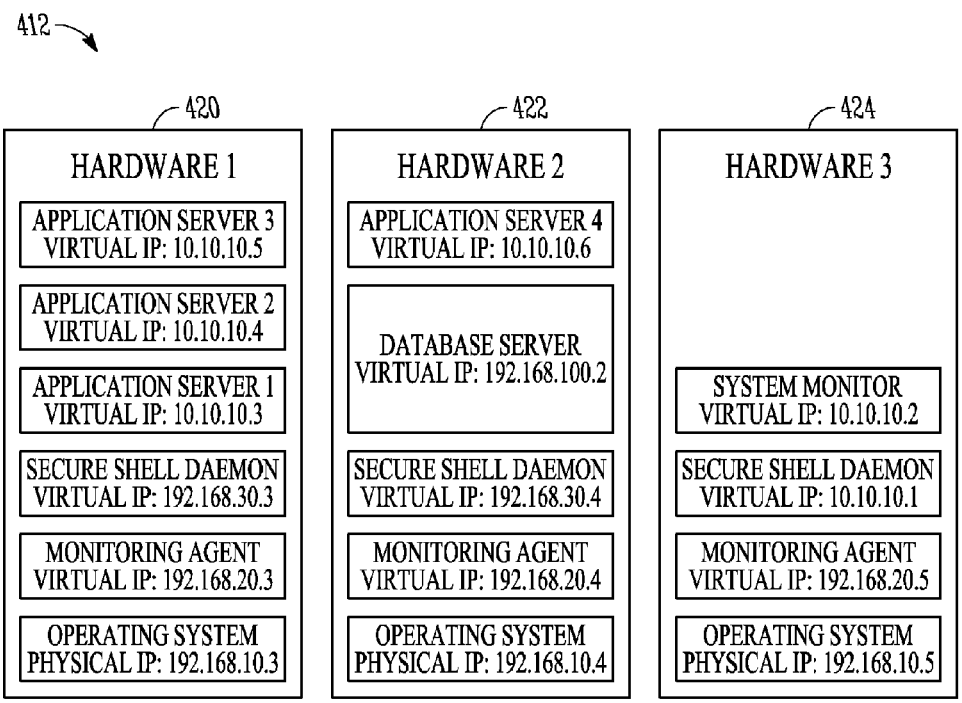
FIG. 5 shows an embodiment of a server network segment of a network setup according to the invention.

Referring now to FIG. 5, an example of an embodiment of the server network segment 412 of the network setup of FIG. 4 is described in more detail. The server LAN 412 comprises three different hardware elements, i.e. a first hardware element 420, a second hardware element 422 and a third hardware element 424. Operating systems, monitoring agents and secure shell daemons run on each of these hardware elements 420, 422, 424.

On the first hardware element 420, three application servers run. It is to be understood that the term "server" does not stand for a hardware element but rather for a service.

The second hardware element 422 comprises a database server as well as a fourth application server which has to access the database server. A global system monitor is installed on the third hardware element 424, which system monitor is fed with data from the monitoring agents.

The three application servers of the first hardware element 420 and the one application server of the second hardware element 422 have routable IP addresses 10.10.10.3, 10.10.10.4, 10.10.10.5 and 10.10.10.6, and can thus be accessed from the "exterior", i.e. from outside the server LAN 412. The database server on the second hardware element 422 is only of interest to the application servers as it never has to be accessed by outside clients directly. Therefore, the database server is assigned an internal, i.e. non-routable address 192.168.100.2.

The monitoring agents only communicate with the system monitor server of the third hardware element 424 and thus have internal addresses 192.168.20.3, 192.168.20.4 and 192.168.20.5. The purpose of the system monitor is to make bundled information of the monitoring agents available to the clients. Thus, the system monitor is assigned an external routable address 10.10.10.2.

The secure shell daemons on the first and second hardware elements shall only be accessible internally for security reasons and thus are assigned non-routable addresses. However, the secure shell daemon of the third hardware element shall be accessible for clients, too, and thus has routable address 10.10.10.1. A log-in to the secure shell daemon of the third hardware element allows for a connection with the secure shell daemons of the first and second hardware elements.

According to the invention, the identical IP range of the server LAN can be used in any number of parallel server LANs, a multi-use of an IP range becomes possible and an IP address space is saved. In case of physical movings of the network system or part of the network system, only the IP addresses of the services have to be changed and the filters have to be adapted as to the new IP addresses which is a trivial matter and can be handled automatically. The invention provides for a novel and inventive method which does not require a conversion or translation of protocols but which rather works on the basis of routing definitions. Obviously, the invention is not limited to the use of only one access address range assigned to the computer network or corporate LAN as it also covers a computer network which is assigned two or even more different ranges of access addresses.

The invention claimed is:

1. A computer network system comprising:
   a plurality of client hardware elements forming a computer network;
   a server network segment comprising a plurality of services, the server network segment associated with a single server system; and
   a router for interconnecting the computer network with the server network segment;
   the computer network being assigned at least one first access address range, and the server network segment being assigned at least one second access address range and at least one third access address range, wherein the at least one second access address range is an exclusive address range separate from the at least one first access address range and the at least one third access address range is a shared address range representing at least a sub-range of the at least one first access address range, each of the plurality of services being assigned one access address within the shared address range or the exclusive address range and the router being set up to route packets on the basis of respective addresses associated with packets being within the shared access address range and to block packets on the basis of respective addresses being from the exclusive address range, wherein the first access address range, the second access address range, the third access address range are private address ranges.

2. A computer network system according to claim 1, wherein the access address ranges are Internet Protocol address ranges.

3. A computer network system according to claim 1, wherein the server network segment is a LAN server.

4. A computer network system according to claim 1, wherein the computer network is a Local Area Network LAN or a Wide Area Network WAN.

5. A computer network system according to claim 1, wherein the router comprises a filter set up to block addresses from the second access address range and to let pass addresses from the third access address range.

6. A network setup method comprising:

assigning one or more first access address range(s) to a computer network;

assigning one or more second access address range(s) to a server network segment comprising a plurality of services, the second access address range(s) being an exclusive address range separate from the first access address range(s); and assigning one or more third access address range(s) to the server network segment comprising a plurality of services, the third access address range(s) being a shared address range representing at least a sub-range of the first access address range(s), so that each service is assigned one access address within the second access address range or the third access address range;

setting up a router for interconnection of the computer network with the server network segment in such a manner that the router routes packets on the basis of respective addresses associated with packets being within the shared access address range, wherein the one or more first access address range(s), one or more second access address range(s), the one or more third access address range(s) are private address ranges.

7. A method according to claim 6, wherein the access address ranges are Internet Protocol address ranges.

8. A method according to claim 6, wherein the server network segment is a LAN server.

9. A method according to claim 6, wherein the computer network is a Local Area Network LAN or a Wide Area Network WAN.

10. A method according to claim 8, further comprising the step of setting up a filter in the router in such a manner that the filter blocks addresses from the second access address range(s) and passes addresses from the third access address range(s).

11. A computer program product with a computer-readable medium and a computer program stored on the computer-readable medium with program coding means which are suitable for carrying out a method according claim 6 when the computer program is run on a computer.

12. A computer-readable medium with a computer program stored thereon, the computer program comprising program coding means which are suitable for carrying out a method according to claim 6 when the computer program is run on a computer.

* * * * *